Feb. 19, 1935.　　　F. I. LIBBEY　　　1,991,858
BRAKE CONTROLLING MECHANISM
Filed May 3, 1932　　　4 Sheets-Sheet 1
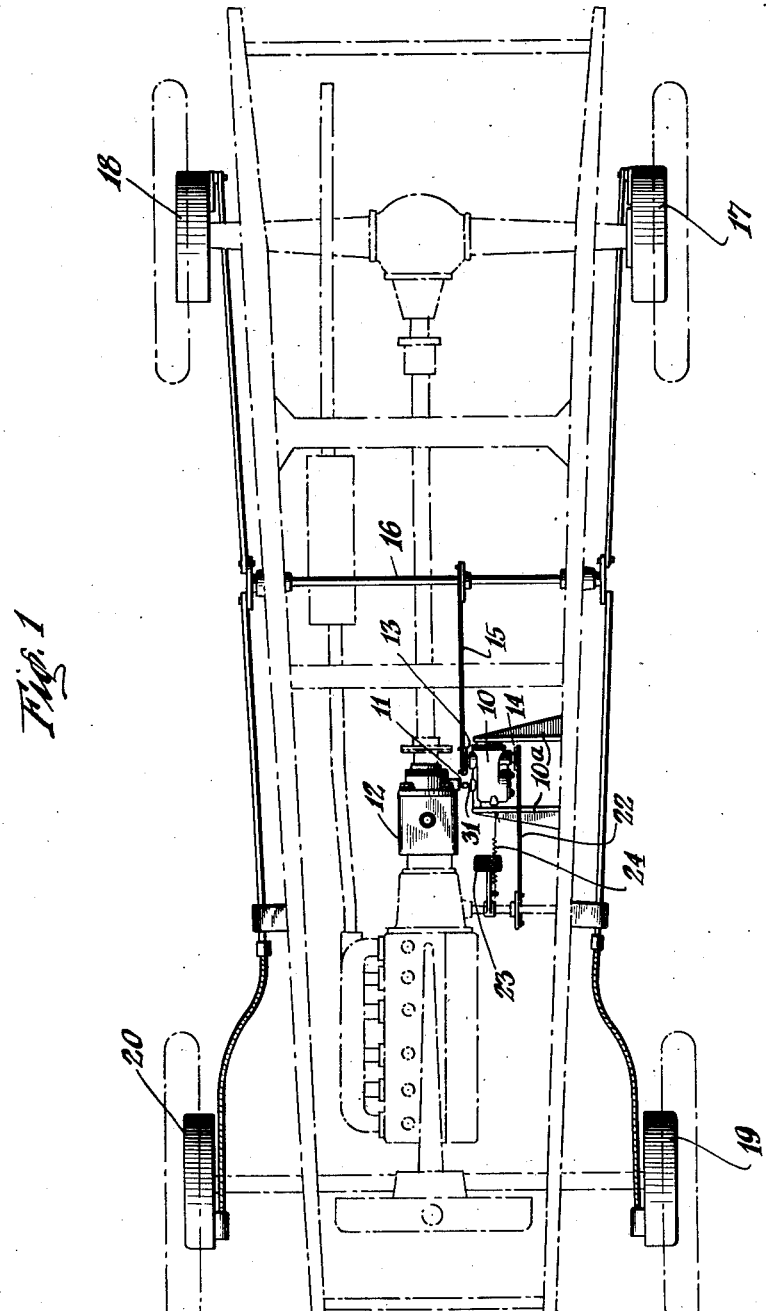
INVENTOR
Frederick I. Libbey
BY
ATTORNEYS Feb. 19, 1935. F. I. LIBBEY 1,991,858
BRAKE CONTROLLING MECHANISM
Filed May 3, 1932 4 Sheets-Sheet 2
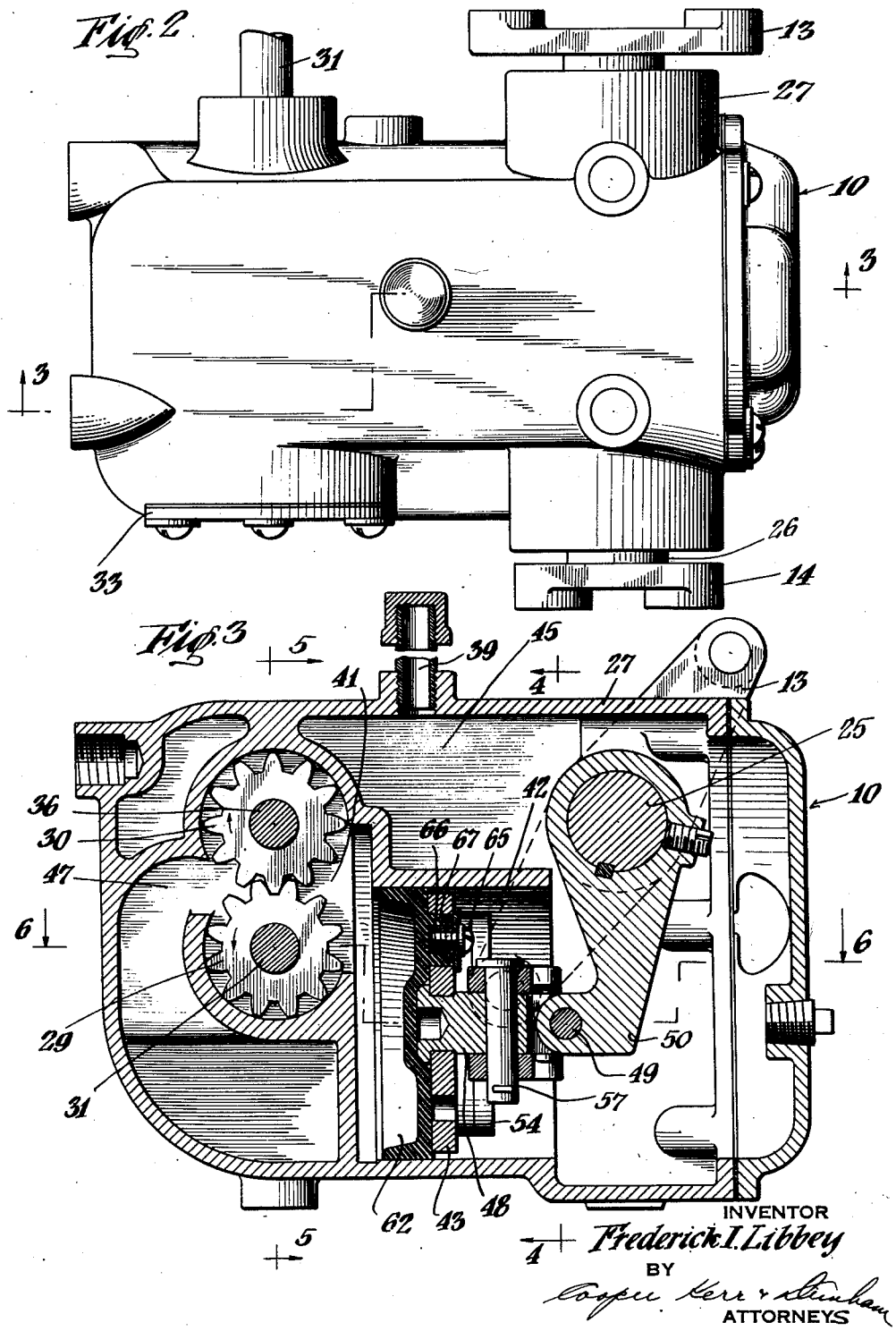

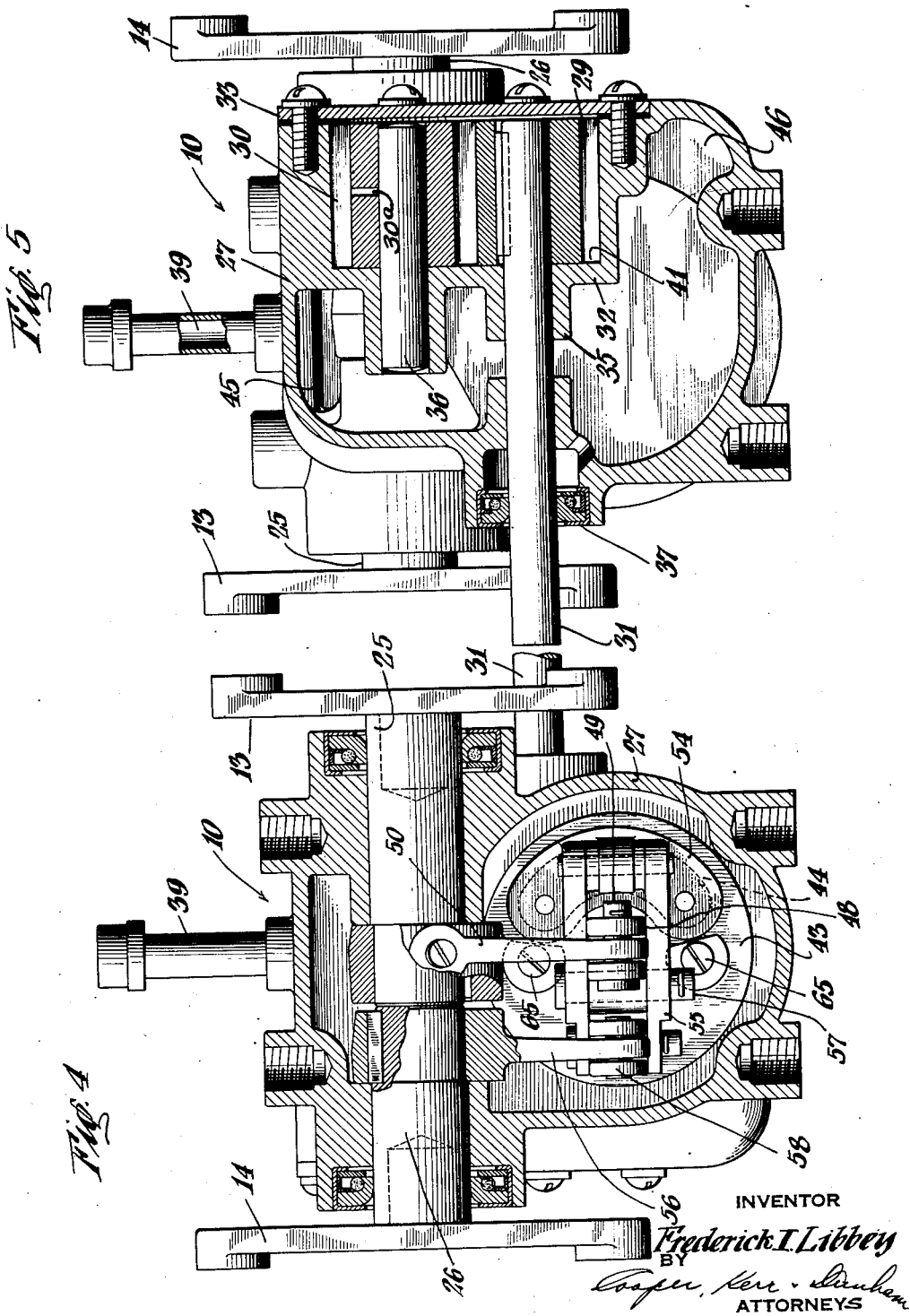

Feb. 19, 1935.    F. I. LIBBEY    1,991,858
BRAKE CONTROLLING MECHANISM
Filed May 3, 1932    4 Sheets-Sheet 4

INVENTOR
Frederick I. Libbey
BY
Cooper, Kerr & Dunham
ATTORNEYS

Patented Feb. 19, 1935

1,991,858

UNITED STATES PATENT OFFICE 1,991,858

BRAKE CONTROLLING MECHANISM

Frederick Irving Libbey, Bronxville, N. Y., assignor to Automatic Brake Corporation, New York, N. Y., a corporation of New York Application May 3, 1932, Serial No. 608,878

4 Claims. (Cl. 60—52)

This invention relates to vehicle braking systems utilizing power for the operation of brakes. One of the objects of this invention is to provide in a brake controlling mechanism comprising a power unit which derives its power through hydraulic pressure under the control of an operator, operator controlled means for the power unit by which the force developed by the power unit is maintained in proportion to the force exerted by the operator, and the effect of the force exerted on the brake actuating mechanism consists of the force developed by the power unit plus a force resulting directly from the operator.

Another object of the present invention is to provide controlling means for the hydraulic power unit which functions automatically to position a valve to be ready for immediate operation for building up required pressure in the power unit irrespective of the rate of flow of the circulating liquid, and hence irrespective of the speed of the vehicle and of the pump controlled thereby.

Another object of the invention is to provide means in the power controlled unit whereby in case of failure of the circulation of fluid while the vehicle is moving direct mechanical connection may be obtained between the pedal controlling the operation of the power unit and the connections to the brakes without necessitating take-up movement on the pedal, so that the braking effort of the operator will continue to be effective on the brakes and not be interrupted because of unnecessary motion of the pedal after the fluid pressure has failed.

Another object of the invention is to produce a compact power unit which is practical and efficient and in which the piston area and/or the fluid pressure may be less than heretofore considered necessary in hydraulic power units used for operating vehicle brakes.

Another object of the invention is to provide a power unit having controlling means which may be easily modified to change the force effective upon the brake for any given pressure on the brake pedal so that the power unit may be readily adapted to different load requirements.

Another object of the invention is to provide controlling means which shall require but a minimum of the available pedal travel.

Another object of my invention is to provide a hydraulic power unit in which the piston may be advanced manually ahead of the flow of liquid when it is desired to do so, as when the vehicle is moving at slow speed and the fluid circulating means is displacing an insufficient volume of liquid to fill the space caused by piston displacement.

Other objects involving novel constructions and combinations of parts will appear in the specification and in the claims thereof, setting forth a preferred embodiment of my invention, which may be fully understood from the detailed description and drawings, in which:

Fig. 1 is a plan view of the chassis of an automobile upon which is mounted the brake controlling unit of the present invention.

Fig. 2 is a plan of the power unit.

Fig. 3 is a sectional elevation on line 3—3 of Fig. 2.

Fig. 4 is a transverse section on line 4—4 of Fig. 3, showing parts broken away.

Fig. 5 is a transverse section on line 5—5 of Fig. 3.

Figure 6:
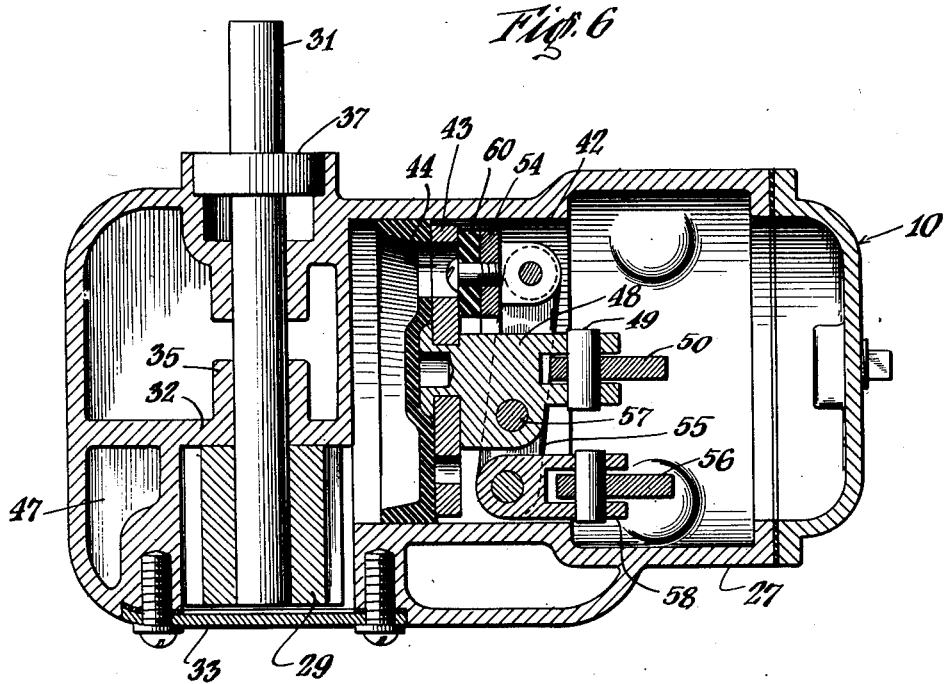
Fig. 6 is a horizontal section on line 6—6 of Fig. 3.

Briefly, the power unit of the present invention has a liquid filled casing including a gear pump which continually circulates the liquid while the vehicle carrying the same is in motion. The gear pump is arranged to develop pressure against a piston whenever it is desired to utilize power for applying brakes. The piston has a port normally open through which liquid freely passes when ordinary running conditions prevail and which is capable of being closed or partly closed for producing desired braking effects. The restriction of the flow of fluid at the port is obtained by a valve which is capable of being positioned under the control of the operator so as to react against the flow of liquid through the port and thereby serve, depending upon its relation to the port, as the means of controlling the fluid pressure exerted upon the piston. The valve is so related to the piston that the force acting to hold the valve against the liquid flowing through the port is added to the force being developed as the result of the liquid pressure exerted on the piston. The piston has connections by which the total force developed is transmitted to the brake actuating mechanism of the vehicle and other connections are provided whereby the operator's pedal may transmit movement directly to the brake applying mechanisms by means of a rigid mechanical construction.

In Fig. 1 of the drawings, I have illustrated a power unit mounted in place on a vehicle and connections with the pedal and a conventional brake applying mechanism. The power unit 10 is supported by any suitable means, such as brackets 10a, extending from the frame of the vehicle, or to the frame itself. Its gear pump may be driven from any shaft which receives its motion from the power plant of the vehicle. In some cases I have found it satisfactory to connect the gear pump shaft 11 with the speedometer shaft mounted to the rear of the transmission housing 12, as shown in Fig. 1.

Outside of the casing of the unit there are arms 13, 14 mounted upon shafts extending from within the unit and whose operation will be described in detail hereinafter. As shown in Fig. 1, arms 13 are mechanically connected with rods 15 to the brake applying mechanism as by means of a brake rock-shaft 16. This rock-shaft may be considered as an element in any conventional braking system by which force is transmitted to the rear brakes 17 and 18 and to the front brakes 19 and 20 of a vehicle. Arms 14 are directly connected by means of rods 22 to a pedal 23 which may be like the ordinary type of brake pedal. A retractile spring is shown at 24.

Having reference to Figs. 3 and 4, the arms 13 which have connection with the brake shaft are mounted upon a shaft 25 in alignment with shaft 26 which carries arms 14. These two shafts are mounted in bearings in casing 27 of the power unit. Casing 27 is cored to form a cylinder, gear pump housing and bearings, and passageways for the circulation of liquid. The pump comprises a pair of gears 29 and 30, Fig. 3. Gear 29 is driven from shaft 31 which extends outside of the casing and is coupled to shaft 11, in turn connected to the speedometer shaft of the transmission. The inner wall or partition 32 of the pump is integral with the casing of the power unit and the outside wall of the gear pump is in the form of a removable plate 33, Fig. 6. The gears may be mounted into position through the opening which is normally covered by the plate 33. It will be understood that the gears are to be fitted close enough to the partition 32 and cover plate 33 for development of adequate oil-pressure when the gears are rotated. One feature of my invention is concerned with the production of a power unit which will give high efficiency at low speeds and at the same time will be compact and will require hardly any attention. Each of the gears of the pump are mounted in such a manner as to eliminate outside bearings and the necessity of providing special lubricating means. For example, bearing 35 for gear 29 is a part of partition 32 of the pump housing and this wall is entirely within the power unit. Gear 30 is mounted upon a stud shaft 36 extending from partition 32 and it is provided with one or more holes 30a whereby its bearing on the shaft may be lubricated. The other bearing 35 is continually immersed in the liquid contained in the power unit, thereby eliminating the necessity of using a special packing but at the same time obtaining high pumping efficiency. It is apparent that any leakage which might occur would not result in loss of any liquid, since the same would remain within the casing. A liquid seal 37 is provided at the outer end of the driving shaft 31 which is located where the liquid pressure is low. While oil, such as castor oil, may be used in this type of unit, any other kind of suitable liquid may be used. Liquids generally used have sufficient lubricating qualities necessary for the lubrication of the pump bearings, gears and other moving parts within the unit.

In the ordinary operation of the power unit the casing is completely filled with the liquid used. In order to provide for expansion of liquid within the unit, an air chamber 39 is provided at the top of the unit. By locating the air chamber at the top of the casing and filling the casing with liquid, air is trapped in the chamber, thereby obviating the possibility of changing the character of the liquid by admixture of air with the liquid.

The rotation of the pump gears 29 and 30 causes the liquid to be circulated within the unit. On the high pressure side 41 of the pump there is disposed a cylinder 42 which contains a piston 43 (Figs. 3, 4 and 6). The piston is provided with a port 44 through which the liquid normally passes when the gear pump is in motion. After passing through the rear of the piston, the liquid returns to the front end of the unit through passage 45 above the cylinder and passage 46 below the cylinder and thence to the space 47 on the low pressure side of the pump. It will be appreciated that if there is any restriction of the free passage of fluid through port 44, liquid pressure will build up which will tend to move the piston. In order to utilize the varying force which may be developed by varying the amount of restriction on the port, the piston has direct connection with the brake applying mechanisms. The piston rod 48 is connected by means of pin 49 to arm 50 fast on shaft 25.

A valve 54 is provided for closing the port 44 and this valve is pivotally mounted upon a rocker 55 which is, in turn, pivotally mounted on piston rod 48 as at 57. The mounting of rocker 55 upon the piston in such a manner as to be movable in unison therewith, makes it possible to add the force applied by the operator upon the pedal to the force being developed by the liquid pressure acting upon the piston. The rocker 55 is actuated through the instrumentality of an arm 56 (Figs. 4 and 6) which is mounted upon shaft 26 and is pivotally connected to the rocker 55 through a link 58. Shaft 26 is under the direct control of the operator through the ordinary brake pedal 23 which has connection with arms 14 mounted upon the shaft.

Upon depression of the brake pedal, valve 54 will be rocked toward port 44 and against the liquid passing through the port, and in the event that there should be no movement of liquid because of inoperation of the pump or failure of the pump driving means, valve 54 will be brought up against the piston and continued movement of the pedal will cause movement of the piston and accompanying movement of the brake applying mechanisms. When the valve is held against the piston there is a direct mechanical connection between the foot pedal and the brake applying mechanisms.

It will be noted that the power being transmitted to the brake applying mechanisms while the power unit is in operation is made up, in part, by a force communicated directly from the effort of the operator on the brake pedal, and that the amount of the force contributed by the operator is in proportion to the amount of force being developed by the pressure of the liquid in the cylinder because this pressure acts directly upon the valve face. Accordingly, the force exerted by the operator at any time is a constant proportion of the entire force developed, irrespective of the total amount of force made available.

As indicated hereinbefore, the pressure exerted upon the piston is dependent upon the amount of restriction of the flow of liquid through port 44 and hence upon the position of the valve 54 in respect to the port. Liquid is circulated so long as the vehicle is in motion, and the passing of liquid through port 44 will tend to maintain the valve displaced a certain distance for any given speed. It is desirable that the brake applying mechanisms should respond immediately to a relatively slight movement of the brake pedal. To accomplish this the valve is arranged in such a manner as to be immediately responsive to pedal movement to produce an immediate change in the degree of restriction of the flow of liquid. This sensitivity is attributable, in part, to the ratio of the arms of the rocker lever 55 which, in the present instance, is substantially 2.

Also, when the valve is forced against the piston disk the pressure exerted by the valve against the piston is only one half of that exerted on the rocker through link 58. This makes it possible to use a soft rubber facing 60 for the valve and thereby obtain efficient sealing of the port each time it is necessary to close the port. This occurs each time the vehicle is brought to a stop and when it is desired to keep the brake applied while the vehicle is at a standstill. When the valve is seated the soft rubber facing assists in trapping the liquid within the cylinder under the pressure which exists in the cylinder just prior to the stopping of the pump when the vehicle is brought to a stop.

A facing of soft rubber 62 in the form of a cup is provided for the piston. The cup edge of the facing normally bears against the wall of the cylinder and acts as an efficient seal against the passage of liquid when the piston is being actuated under pressure. The metallic disk portion of the piston is of slightly less diameter than the diameter of the cylinder and this clearance enables the flow of liquid from the rear of the piston at a moment when there is not sufficient liquid in the cylinder to follow up a manual movement of the piston. Accordingly, under any conditions requiring the take-up of slack in the braking system at a time when the pump is not delivering a sufficient volume of liquid to take care of the necessary piston travel, fluid may pass the edges of the rubber cup (from the right hand side of the piston, Fig. 6) to completely fill the cylinder so that when the resistance of the brake drums is encountered, any slight addition of liquid to the cylinder under pump pressure will cause immediate building-up of pressure on the piston. This construction enables the use of a relatively small gear pump which need not be large enough to instantly provide a large quantity of liquid to take care of displacement of the piston. Foot power alone is all that is necessary to move the brakes up to a point where the bands contact with the drum since this action requires but comparatively little force. In bringing the bands into contact with the drums, the motion of the piston resulting from this action causes the liquid to pass into the cylinder at the edges of the rubber cup and, as soon as an appreciable resistance is encountered in the braking system, booster pressure is immediately available because of the cylinder being filled with liquid.

While the rubber cup may be separable from the piston, I have shown the same attached thereto by means of screws 65 engaging nuts 66 molded into a boss extending rearwardly from the cup 67. It will be noted that the point of fastening is so located as to permit the flexing of the edge of the cup for permitting liquid to pass the edge under certain conditions as outlined hereinbefore.

It will be appreciated that the size of the valve 54 is a factor in the force transmitted to the brakes by the operator. Accordingly, the power unit may be adapted for different installations which require greater output in a power unit of this kind, for in the present construction it is only necessary to select a valve having an area for adapting the power unit for greater or lesser output.

Figure 7:
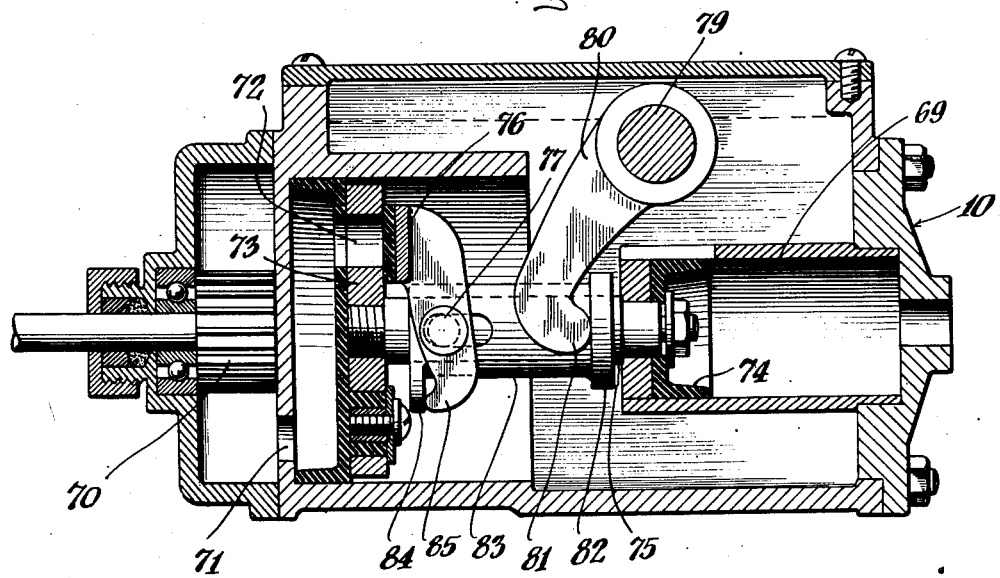
Fig. 7 is a vertical section of a modification of the present invention.

In Fig. 7 I have illustrated a modification of the present invention for use with a hydraulic braking system. This power unit is operated in a manner similar to that already described. Pressure is applied by a gear pump 70 which delivers liquid into the cylinder through port 71. A port 72 in piston 73 permits the passage of liquid from the cylinder to the rear of the piston from whence it is returned through passages in the casing to the low pressure side of the pump. Within the casing there is an auxiliary cylinder 69 which has a direct connection with the pipes of a hydraulic braking system and within the auxiliary cylinder is a piston 74 which is connected by means of piston rod 75 with piston 73. Port 72 is adapted to be restricted by means of a valve 76 which is mounted upon a rocker 85 straddling piston rod 75 and pinned thereto at 77. The mechanism which has just been briefly described operates in a manner similar to the manner in which the power unit already described operates, but in the present unit different provisions are made for controlling the operation of the valve. Shaft 79 has connection with a brake pedal and is responsive to the movement of the brake pedal. Bifurcated arm 80 is fixed to shaft 79 and has projections 81 adapted to contact a flange 82 at one end of a sleeve 83. The other end of sleeve 83 carries a projection 84 adapted to contact one end of rocker 85 and pivot the same about its pivot pin 77. The sleeve 83 is slotted to accommodate pin 77 and permit movement of the sleeve relative to the piston rod whenever the valve is rocked in relation to the piston. When force is applied to shaft 79 valve 76 is rocked against the flow of liquid through port 72 and a portion of the operator's effort is added to the force developed by the liquid pressure through pin 77. The total effective force causes movement of the piston and displacement of liquid in cylinder 69 which is in communication with the liquid of the hydraulic brake system.

I claim:

1. In a self-contained hydraulic power unit for automobile brake systems, in combination, a casing for a liquid, a cylinder therein, a pump taking liquid from the casing and delivering the same to the cylinder, a piston movable in the cylinder and provided with a short piston rod at the axis of the piston, wholly inside of said casing, the piston having a port between its periphery and the piston rod for passage of liquid delivered by the pump, a valve lever pivoted between its ends on said piston rod, a valve carried by one end of the lever to cooperate with the port in the piston to control the passage of liquid therethrough, a shaft extending into the casing and provided outside of the same with operator-operable actuating means, an arm fixed on the said shaft inside of the casing and connected with the other end of said valve lever to swing the valve toward and from the port in the piston, a second shaft extending into the casing and provided outside of the same with brake-actuating means, and an arm fixed on the second shaft inside of the casing and connected with the piston rod for actuation thereby.

2. In a self-contained hydraulic power unit for automobile brake systems, in combination, a casing for a power liquid, a power cylinder having one end open to the casing, a pump having its intake side open to the casing and its delivery side open to the other end of the cylinder, a piston in the cylinder, having a port adjacent to its periphery and provided with a short axial piston rod, a pivoted brake-actuating arm inside of the casing and connected with the piston rod for actuation by movement of the piston, a valve pivoted on the piston rod inside of the casing, a pivoted operator-operatable arm inside of the casing, and a link pivoted at one end directly to the operator-operable arm and at its other end connected to the pivoted valve to swing the same toward and from the port in the piston as said arm is rocked by the operator.

3. In a self-contained hydraulic power unit for automobile brake systems, in combination, a casing for a power liquid, a power cylinder therein of relatively large diameter and relatively short length, a piston movable in the cylinder, having an arc-shaped port adjacent to its periphery and provided with a short axial piston rod, a rocker pivoted on the piston rod and having an arc-shaped valve to cooperate with said port, operator-operable means located inside of the casing and connected with the valve rocker to actuate the same, and a pivoted brake-actuating arm located inside of the casing and pivoted to the piston rod for direct actuation thereby.

4. In a self-contained hydraulic power unit for automobile brake systems, in combination, a casing for a power liquid, a power cylinder therein having one end open rearwardly to the interior of the casing, a gear pump in front of the cylinder with its high-pressure side open to the cylinder for delivery of liquid directly thereto, a piston in said cylinder, having a short axial rod on the low-pressure side, said piston having a port adjacent to its periphery for passage of liquid therethrough from the high-pressure side, a valve lever pivoted between its ends on the piston rod adjacent to the piston, a valve carried by the lever at one end thereof to cooperate with said port, a brake-actuating shaft mounted in a wall of the casing and extending into the same in rear of the cylinder, an arm fixed on said shaft and pivoted to the piston rod, an operator-operable shaft mounted in the opposite wall of the casing and extending into the same in rear of the cylinder, and an arm fixed on the latter shaft and pivoted to the other end of the valve lever.

FREDERICK IRVING LIBBEY.